(12) United States Patent
Boecker et al.

(10) Patent No.: US 9,592,631 B2
(45) Date of Patent: Mar. 14, 2017

(54) BLOW MOLDING PROCESS AND APPARATUS

(71) Applicant: TI Automotive Technology Center GmbH, Rastatt (DE)

(72) Inventors: Albert J. Boecker, Ettlingen (DE); Andreas W. Dobmaier, Karlsruhe (DE); Alex Ehler, Rastatt (DE); Patrick Gmuend, Karlsruhe (DE); Peter Grauer, Steinweiler (DE); Gerrit A. Michaelis, Friesenheim (DE); Matthias B. Olbrich, Rastatt (DE)

(73) Assignee: TI Automotive Technology Center GmbH, Rastatt (DE)

( * ) Notice: Subject to any disclaimer, the term of this patent is extended or adjusted under 35 U.S.C. 154(b) by 383 days.

(21) Appl. No.: 14/134,607

(22) Filed: Dec. 19, 2013

(65) Prior Publication Data

US 2014/0239557 A1  Aug. 28, 2014

(30) Foreign Application Priority Data

Feb. 25, 2013  (DE) .................... 10 2013 203 085

(51) Int. Cl.
 *B29C 49/56* (2006.01)
 *B29C 49/20* (2006.01)
 (Continued)

(52) U.S. Cl.
 CPC .............. *B29C 49/20* (2013.01); *B29C 49/04* (2013.01); *B29C 49/30* (2013.01);
 (Continued)

(58) Field of Classification Search
 None
 See application file for complete search history.

(56) References Cited

U.S. PATENT DOCUMENTS 3,699,201 A * 10/1972 Turner ................ B29C 49/4817
                                                              264/150
4,952,347 A    8/1990 Kasugai
                      (Continued)

FOREIGN PATENT DOCUMENTS

DE        10231866 A1    1/2004
DE      102006031902 A1    1/2008
             (Continued)

OTHER PUBLICATIONS

Search Report dated Jun. 27, 2014 in EP Application 14155404. 8—5 pages.
(Continued)

*Primary Examiner* — Monica Huson
(74) *Attorney, Agent, or Firm* — Brinks Gilson & Lione

(57) ABSTRACT

In at least some implementations, a blow molding process provides that portions of the parison are engaged by one or more clamping devices disposed on or adjacent to the blow mold parts, and that the blow mold is opened whereby the parison is torn apart between the clamping devices, into two or more pieces of the parison. In other implementations, the clamping devices may be moved relative to the blow mold to tear the parison, or the parison may be torn by a combined movement of the blow mold parts and clamping devices.

19 Claims, 3 Drawing Sheets

(51) Int. Cl.
    *B29D 22/00* (2006.01)
    *B29C 49/04* (2006.01)
    *B29C 49/30* (2006.01)
    B29C 49/18 (2006.01)
    B29C 47/00 (2006.01)
    B29L 31/00 (2006.01)
    B29C 49/16 (2006.01)
    B29C 49/42 (2006.01)
    B29C 49/48 (2006.01)
    B29K 105/00 (2006.01)

(52) U.S. Cl.
    CPC ...... *B29C 49/4242* (2013.01); *B29C 49/4252* (2013.01); *B29C 49/4268* (2013.01); *B29C 49/56* (2013.01); *B29D 22/003* (2013.01); B29C 47/0023 (2013.01); B29C 47/0054 (2013.01); B29C 47/0066 (2013.01); B29C 49/16 (2013.01); B29C 49/18 (2013.01); B29C 49/4247 (2013.01); B29C 49/48 (2013.01); B29C 2049/2008 (2013.01); B29C 2049/563 (2013.01); B29C 2791/007 (2013.01); B29C 2793/009 (2013.01); B29C 2793/0036 (2013.01); B29C 2793/0045 (2013.01); B29C 2793/0063 (2013.01); B29C 2793/0081 (2013.01); B29K 2105/258 (2013.01); B29K 2995/0081 (2013.01); B29L 2031/7172 (2013.01)

(56) References Cited

U.S. PATENT DOCUMENTS

| | | |
|---|---|---|
| 5,554,422 A | 9/1996 | Gill et al. |
| 5,589,241 A | 12/1996 | Stiles et al. |
| 5,885,515 A | 3/1999 | Hudkins |
| 6,033,749 A | 3/2000 | Hata et al. |
| 6,440,353 B1 | 8/2002 | Hutchins |
| 6,485,668 B1 | 11/2002 | Murphy et al. |
| 6,712,234 B2 | 3/2004 | Boecker |
| 6,808,673 B2 | 10/2004 | Van Schaftingen |
| 6,866,812 B2 | 3/2005 | Van Schaftingen et al. |
| 6,893,603 B2 | 5/2005 | Rohde et al. |
| 6,916,442 B2 | 7/2005 | Dupont et al. |
| 6,969,246 B1 | 11/2005 | Kundinger et al. |
| 7,097,445 B2 | 8/2006 | Brandner et al. |
| 7,387,699 B2 | 6/2008 | Ideno et al. |
| 2002/0105115 A1 | 8/2002 | Sadr |
| 2002/0110658 A1 | 8/2002 | Lucke et al. |
| 2003/0164572 A1 | 9/2003 | Pappert et al. |
| 2003/0198768 A1 | 10/2003 | Delbarre |
| 2005/0040566 A1 | 2/2005 | Knueppel et al. |
| 2005/0040567 A1 | 2/2005 | Knueppel et al. |
| 2005/0104260 A1 | 5/2005 | Van Schaftingen et al. |
| 2006/0141184 A1 | 6/2006 | Rohde et al. |
| 2008/0038497 A1 | 2/2008 | Nemoto |
| 2010/0078842 A1 | 4/2010 | Mellander |
| 2011/0140314 A1 | 6/2011 | Grauer |

FOREIGN PATENT DOCUMENTS

| | | |
|---|---|---|
| EP | 0087828 A1 | 9/1983 |
| EP | 1334817 A1 | 8/2003 |
| EP | 2141000 A2 | 1/2010 |
| EP | 2141000 A2 | 6/2010 |
| JP | 2006103116 A | 4/2006 |
| WO | WO0015418 A1 | 3/2000 |
| WO | WO2004007182 A1 | 1/2004 |

OTHER PUBLICATIONS

European Search Report for Application No. 09164146.4-2307/ 2141000, dated Jun. 21, 2010, 7 pages.
Written Opinion and International Search Report for PCT/US2010/ 39914, mailed Feb. 11, 2011, 6 pages.

* cited by examiner

BLOW MOLDING PROCESS AND APPARATUS

CROSS REFERENCE TO RELATED APPLICATIONS

This application claims priority to German Patent Application No. 102013203085.1 filed Feb. 25, 2013, which is incorporated herein by reference in its entirety.

TECHNICAL FIELD

The present disclosure relates generally to a blow molding process and apparatus for making a fluid container, which in at least some implementations is a fuel tank for a vehicle.

BACKGROUND

Blow molding is a well-known process for making plastic products, in particular containers or hollow bodies such as fuel tanks. The process usually encompasses extruding a parison, which may consist of a plurality of layers of different material, and transporting the still hot parison to an open blow mold, where it is disposed between the blow mold halves. The blow mold halves are then closed, capturing the parison between them, and the interior of the parison is subjected to a pressure medium, thereby inflating the material of the parison against the inside walls of the blow mold and shaping it accordingly. Especially in the case of fuel tanks there is often a desire to form not only the tank itself, but also to position on the inside of the tank components of the fuel system, for example a fuel pump, a fuel filter, baffles to prevent or reduce sloshing of the fuel during operation of the vehicle, hoses for fuel and venting, and cabling for the electrical supply to the fuel pump. This poses some practical challenges.

SUMMARY

In at least some implementations, a blow molding process provides that portions of the parison are engaged by one or more clamping devices disposed on or adjacent to the blow mold parts, and that the blow mold is opened, and/or one or more of the clamping devices are moved, whereby the parison is torn apart between the clamping devices, into two or more pieces of the parison. The clamping devices may be integrated into the blow mold and may be of a simpler mechanical design than a cutting mechanism. The tearing-apart of the parison is also quicker than the use of the known cutting mechanisms, so that the total process time is reduced and the productivity of the process is increased. Moreover, the tearing-apart may be performed along a complexly shaped contour. In at least some implementations, a further step in the process includes placing at least one object in between the torn apart pieces of the parison, for example a carrier for at least one fuel system component, such as a fuel pump, venting valves, baffles, hoses, and other objects typically used inside a fuel tank.

The clamping devices provided on each blow mold half may each comprise a groove, into which groove material of the parison is pressed in a bead-like manner when the parison is subjected to the gaseous pressure medium. Further, the clamping devices may each comprise a clamping member which is adapted to be displaced in an opening and closing direction of the blow mold parts, and a stop surface disposed opposite to the clamping member, wherein the groove is formed between the clamping member and the stop surface and wherein the clamping member is moved in the direction of the stop surface, or the stop surface in the direction of the blow mold, in order to facilitate the clamping of the material of the parison.

In at least some implementations, the blow mold halves are moved with respect to each other and an extruder is disposed adjacent to the blow mold, which extruder extrudes the parison of plastic material that is introduced into the blow mold. Especially in those cases where the extruder is not positioned above the blow mold and the parison is introduced into the blow mold by way of gravity, the parison may be introduced into the blow mold by means of a gripping device, which for example grips the parison by means of pneumatic suction members and transports it to the blow mold.

After tearing apart the preformed tank the thus created pieces of the parison may be placed against the parts of the blow mold and the space between the pieces and the parts of the blow mold can be evacuated, or the interior space of the parison subjected to a pressure medium while the blow mold is closed, in order to perform a forming of the pieces of the parison which corresponds to the final shape of the hollow body.

Expediently, the object is brought into contact, in a form-fitting and/or friction-fitting manner, with the inside of the wall of at least one of the pieces at least at specific locations before the blow mold parts are closed. To this end, the object may be made at least partially of a plastic material which can be welded, clamped or otherwise connected to at least one of the pieces of the parison. The remainder of the object may be made of any material suitable for the intended application, for example of fuel resistant material in the case of a fuel tank.

In a further process step the pieces of the parison are, after being fully formed against the parts of the blow mold, materially fused to each other with opposing edge regions, which regions are still molten-hot or which have been reheated, by moving the blow mold parts against each other. The finished product is then removed from the blow mold and processed further, as desired.

The apparatus for making a hollow body, in particular a fuel tank, by way of a blow molding process, comprises a blow mold that consists of at least two parts, the at least two parts of the blow mold having edge regions that are disposed in a complementary opposed relation to each other, wherein clamping mechanisms oriented toward the inner region of the blow mold are provided at the edge regions, each of which comprises a groove which is variable in its width by means of a clamping element.

In at least some implementations, the clamping element moves between first and second positions that correspond to open and clamped positions of the groove wherein the effective size of the groove is less in the clamped than open position. The groove is adapted to receive, in the open position, material of a molten-hot parison, and the clamping element is adapted to be displaced toward a stop surface of the clamping mechanism, thereby capturing the material of the parison in a form-fitting and/or friction-fitting manner in a clamped position. The clamping may alternatively be effected by moving the stop surface in the direction of the blow mold, or by moving both the stop surface and clamping element toward each other. The parts of the blow mold are adapted to be moved apart while the clamping mechanism is in its clamped position, thereby tearing the parison into two or more pieces.

Alternatively, the clamping element(s) is/are carried by one or more sliders that are movable relative to the parts of the blow mold and the parison tearing is accomplished by movement of the sliders relative to the parts of the blow mold, in at least some implementations, such tearing is accomplished without any accompanying movement of the parts of the blow mold.

An apparatus for making a hollow body, in particular a fuel tank, by a blow molding process, may include at least two parts which are adapted to be moved relative to each other between an opened position and a closed position to separate a parison of extruded plastic material into at least two pieces by means of the apparatus. Edge portions of the parison pieces are arranged on projections of the blow mold parts that are disposed at a plurality of locations in regions outside of the hollow body to be made (e.g. in scrap regions of the parison), in order to prevent a warping of the separated pieces in the opened position of the blow mold parts. For ease of installation, repair or replacement, the projections may be formed as pins screwed into screw holes in the blow mold parts.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1A:
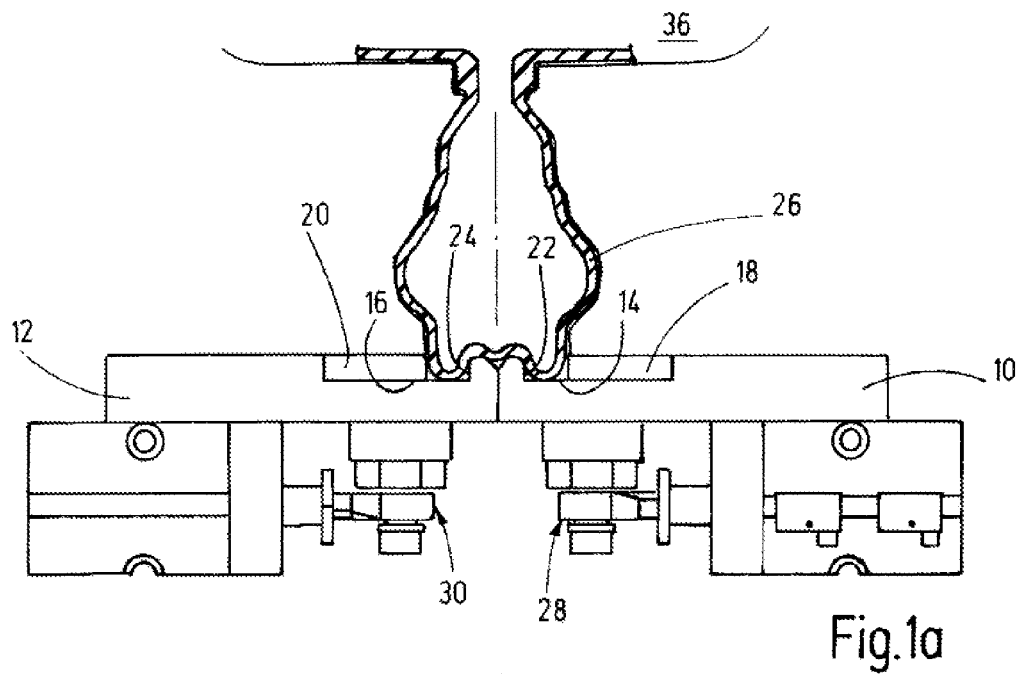
FIG. 1a-c is a side elevation of a clamping device for clamping and tearing a parison in a blow mold.

U.S. patent application Ser. No. 12/491,962 filed Jun. 25, 2009, discloses an apparatus and a process for forming a polymeric container by blow molding an extruded parison. This application is incorporated herein by reference in its entirety, and the detailed process of extruding a plastic parison, locating it in a blow mold and expanding the parison material under pressure will not be further described herein. The process may be performed by an apparatus that generally includes two or more blow mold parts that define the final shape of the container and into which the parison is expanded to conform to the blow mold parts. In the implementation shown, two blow mold parts 8 (FIGS. 2 and 3) are used and each may form about one-half of the container.

The clamping device shown in FIG. 1 includes or is provided in sliders 10, 12 of a blow mold. The sliders 10, 12 may be associated with, such as by being carried by or adjacent to, the blow mold parts 8. The sliders 10, 12 are driven by an actuator or actuators 28, 30 for movement relative to the blow mold parts 8. In one implementation, a parison 26 may be received within a cavity 36 defined by the blow mold parts 8 and the blow mold parts may be partially closed. The sliders 10, 12 may be actuated to close off at least part of a gap that remains between the partially closed mold parts 8. Then, a pressurized medium may be provided into the parison 26 to provide an initial expansion of the parison 26 into the cavity 36 in what is sometimes called a pre-blow molding step.

Each slider 10, 12 may include a groove 14, 16 oriented such that it is open toward the interior region of the blow mold. In or adjacent to each groove 14, 16 there is disposed a clamping element 18, 20 adapted to be laterally displaced within or relative to the groove. A gap of variable width is thus formed between the clamping element 18, 20 and a stop surface 22, 24 of the slider, into which gap molten material of the parison 26 enters in a process step in which the parison is partially inflated (e.g. a pre-blow molding step). The clamping elements 18, 20 are then displaced in the direction of the stop surfaces 22, 24, so that the material of the parison 26 is captured in between. The actuation members 28, 30, for example a hydraulic or pneumatic cylinder, are provided on the exterior of and may be carried by the blow mold parts 8 for displacing the clamping elements 18, 20. When the blow mold is opened (FIG. 1c) and the clamping elements 18, 20 are engaged with the parison material, the material of the parison 26 is torn apart between the clamped portions along the contour of the clamping device (FIG. 3).

Figure 4:
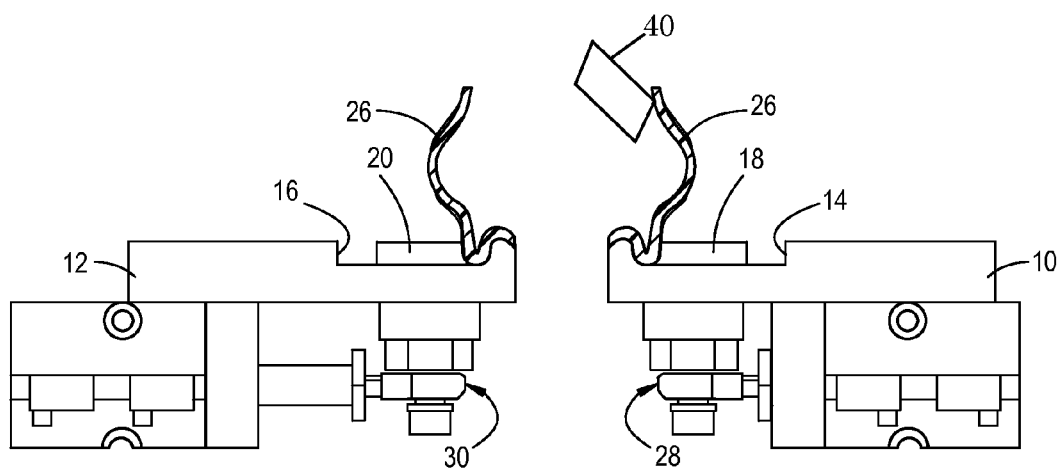
FIG. 4 is a side elevation of a clamping device where sliders are moved relative to blow mold parts to tear a parison.

Optionally, as shown in FIG. 4, the sliders 10, 12 may be moved separately from and relative to the blow mold parts 8 to tear the parison 26, or the tearing movement may be a combination of mold part and slider movement. Further, sliders 10, 12 may be associated with each mold part 8 and only some of the sliders may be moved relative to other sliders to tear the parison 26 (for example, only the slider 10 on the right-hand side is shown as having moved in FIG. 4, although both sliders may move, or one slider and the opposed mold part may move, etc). That is, relative movement between two portions of the parison 26 can cause the tearing and that may be accomplished by any independent or combined movement of any of the sliders 10, 12 and blow mold parts 8.

Figure 2:
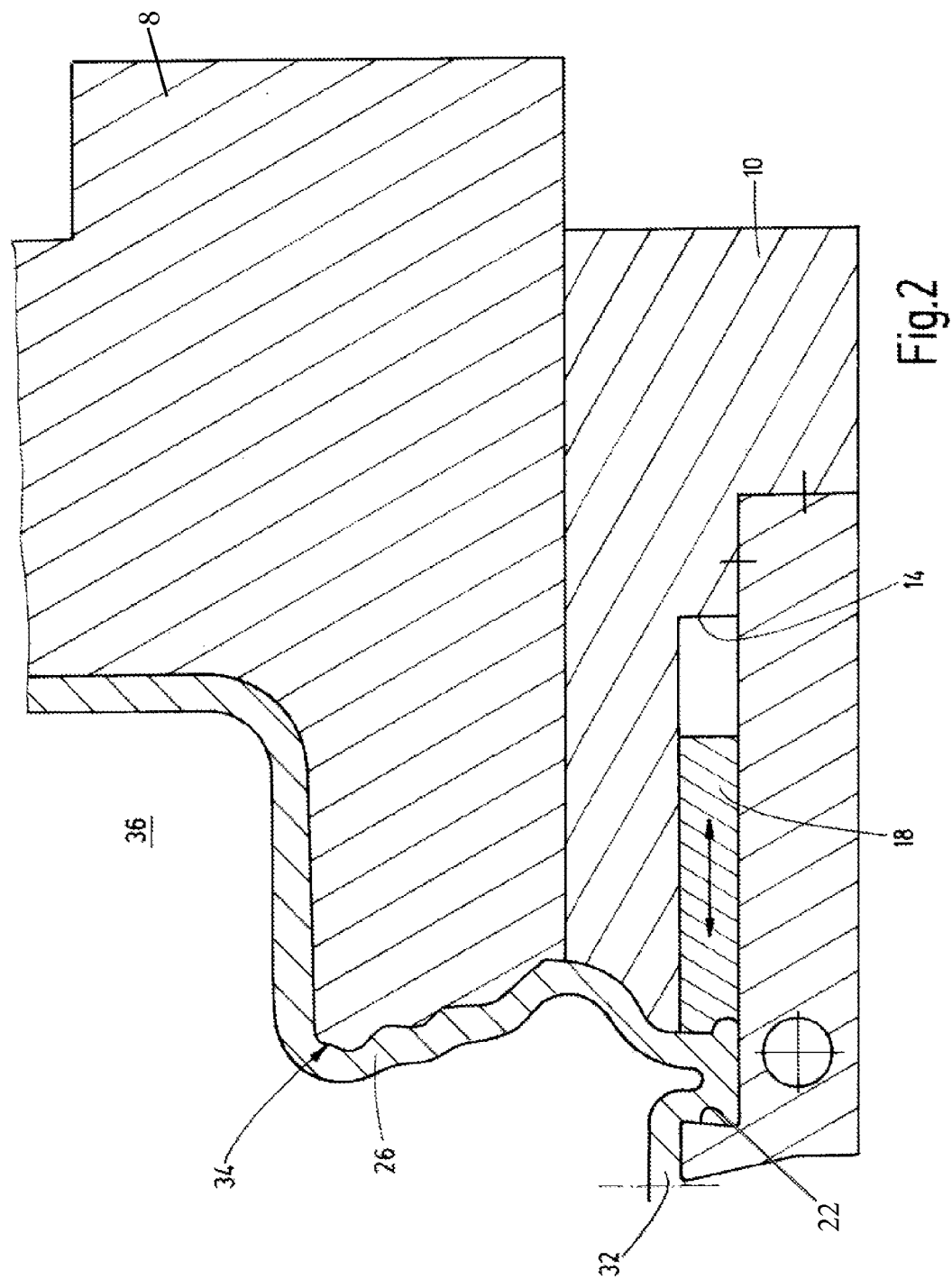
FIG. 2 is a section through on blow mold half in the region of the clamping device.

FIG. 2 shows a section through part of one blow mold halves 8 in the region of its slider 10 (not shown is the actuation member for the clamping element 18). The tearing of the parison occurs in the region 32 of the parison 26, while the mating of the two tank halves occurs in the region designated by reference numeral 34, which creates the so-called pinch line. The tearing therefore occurs in a region removed from that part of the parison 26 which later forms the finished tank and in a region later removed from the formed tank. In at least some implementations, the tearing region 32 is outboard of the pinch line relative to the interior of the parison (i.e. on the other side of the pinch line from the interior of the parison). Consequently, there are no exacting demands regarding the quality of the tear line through the parison since, in at least some implementations, the torn material will not form part of the final fuel tank.

Figure 3:
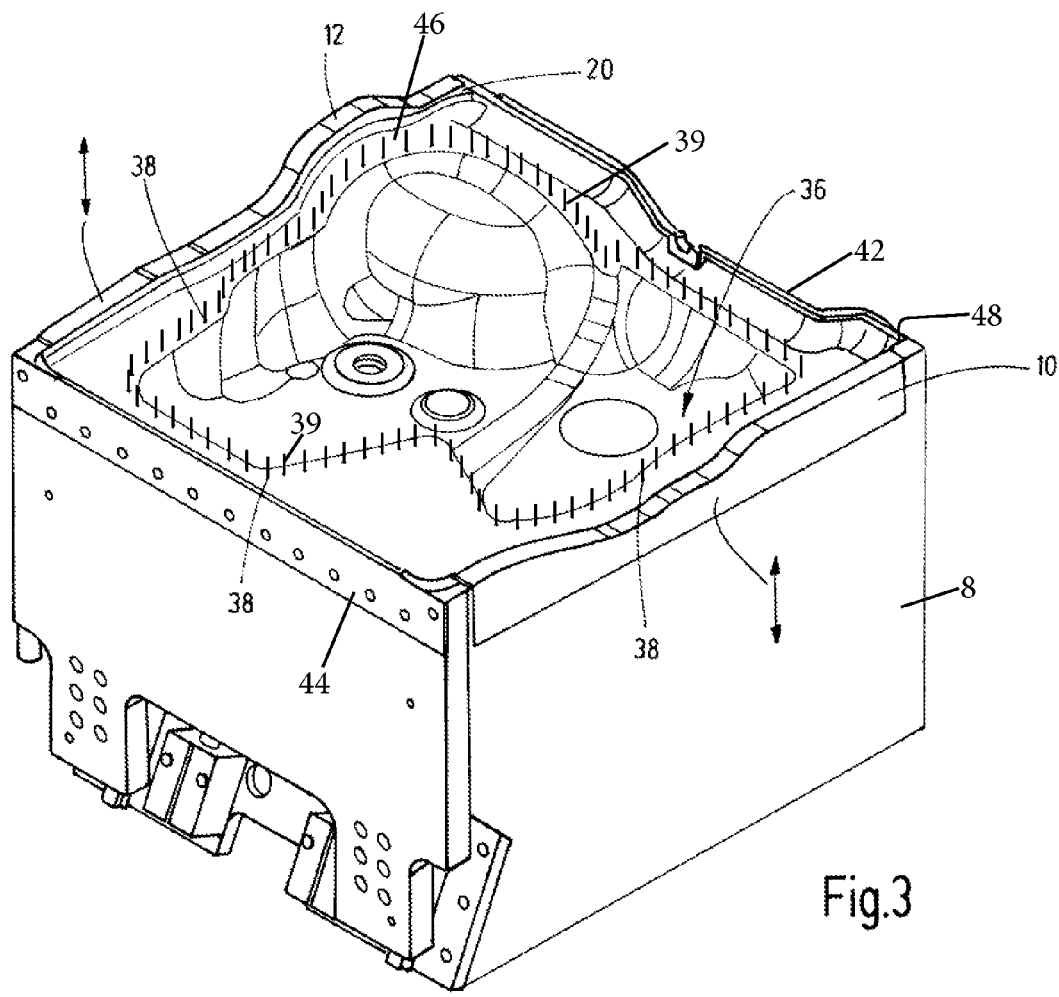
FIG. 3 is a perspective view of a blow mold half having clamping devices installed at two edge regions thereof.

The lower half of a blow mold 8 shown in FIG. 3 features a cavity 36, the contour of which forms the shape of the corresponding tank half. At two opposed sides of the substantially rectangular blow mold sliders 10, 12 are provided, each having one or more clamping elements 18, 20, in the form of elongated, contoured bars. The bars are adapted to be displaced by means of actuation members, which, by way of only a few possibilities, may include pneumatic or hydraulic drives. During a first, partial inflation of the parison the molten material enters into the gap formed between the clamping elements 18, 20 and the sliders 10, 12, and is then captured therebetween by displacing the clamping elements. The second blow mold half (not shown) may be similarly formed and equipped with corresponding sliders and clamping devices. After the material of the parison 26 is thus captured, the blow mold halves 8 are moved apart, tearing the parison into two half-pieces (in this implementation—other implementations may provide more than two pieces). Once the parison 26 is separated into two or more pieces, the interior of those pieces may be accessed to mount one or more objects 40 (FIG. 4) and/or fuel system components thereon, provide a coating or other treatment, or form the interior surfaces (e.g. by pressing something into the surface) such as to provide a different contour for at least some portion of the interior surface for structural or other reasons.

FIG. 3. further shows a plurality of screw holes 38 in a circumference region of the cavity 36. These screw holes are intended to accept screw pins 39 which protrude from the surface of the blow mold half 8. The material of the parison or half-pieces is anchored by these pins 39 before and after the tearing step, which hold the parison pieces in place relative to the blow mold parts 8, in particular when the blow mold is open. While described as screw holes 38 and screw pins 39, threaded connection is not required and other constructions may be used.

Accordingly, a blow molding process for making a hollow body, in particular a fuel tank, may include the following steps: placing a parison between parts of a blow mold, partially closing the blow mold, closing end regions of the parison in a gas tight manner, and subjecting the interior space of the parison with a gaseous pressure medium whereby the parison is at least partially pressed against the inner surfaces of the blow mold parts and the hollow body is preformed. Portions of the parison are engaged by the clamping devices disposed on the blow mold parts and the blow mold is opened whereby the parison is torn apart between the clamping devices, forming two half-pieces. Alternatively or in combination with movement of the blow mold parts, at least certain of the sliders may be moved relative to at least some of the blow mold to effect the tearing of the parison.

Figure 1B:
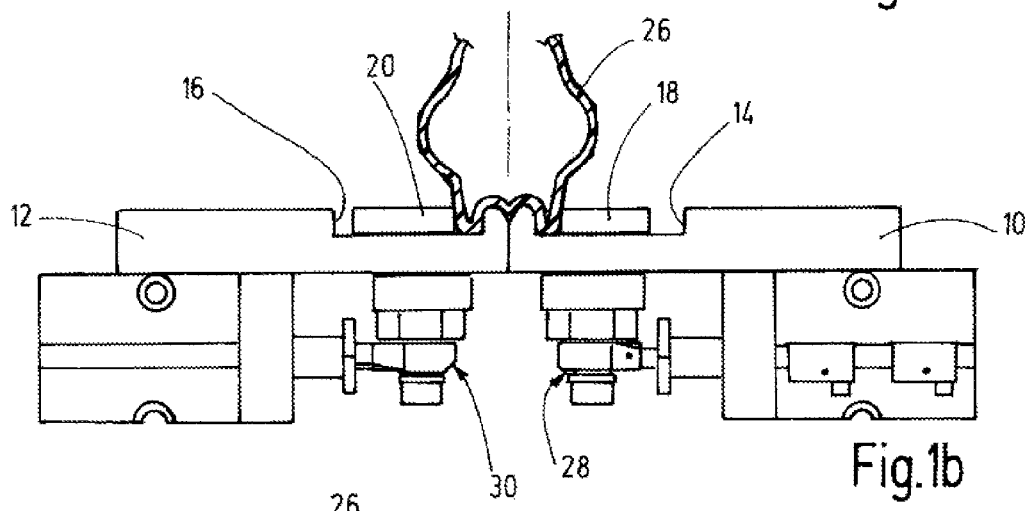
Figure 1C:
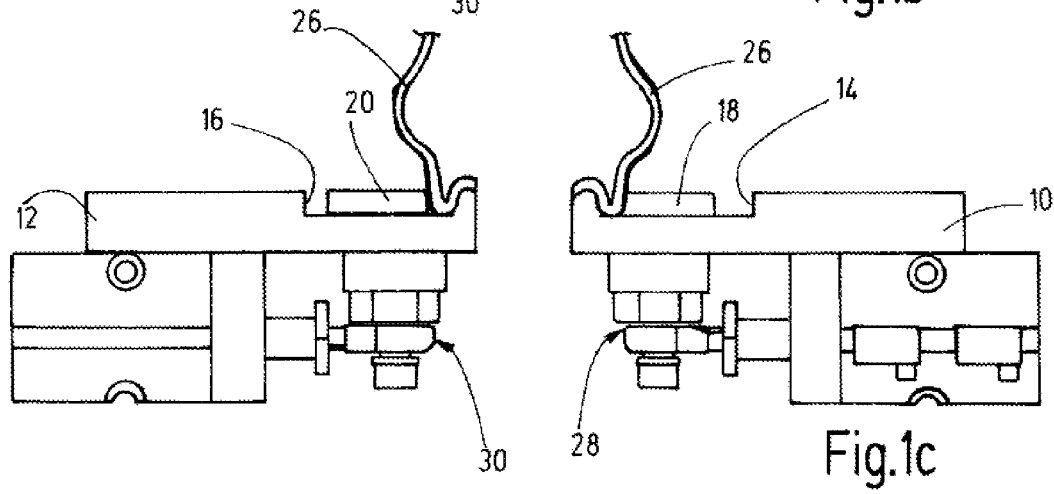

When the blow mold is partially closed, a space may exist between adjacent parts 8 of the blow mold and one or more sliders 10, 12 may be positioned in that space so that the clamping devices (e.g. groove and clamping element) are oriented to receive parison material as described. Sliders 10, 12 extending from adjacent blow mold parts 8 may at least partially close off the space between the blow mold parts to prevent or inhibit parison material from expanding or flowing between the sliders. Thus, the sliders 10, 12 may define part of an enclosure or cavity into which the parison 26 is expanded during a pre-blow molding step. This extended slider position is shown in FIGS. 1*a* and 1*b*. A subsequent, final blow molding step may occur with the blow mold parts 8 closed together, and the sliders 10, 12 retracted relative to the blow mold parts so that the sliders do not form part of the final blow molding cavity 36 that defines the final molded shape of the container. Instead, in these implementations, the final blow molding cavity 36 is defined entirely by the blow mold parts 8. This retracted slider position is shown in FIG. 1*c* and FIG. 3. In these implementations, the volume of the final blow mold cavity is smaller than the volume of the pre-blow mold cavity that is defined in part by the sliders.

In at least certain implementations, the blow mold parts 8 may include upper and lower ends 42, 44 and opposed sides 46, 48 extending between the upper and lower ends. The sliders 10, 12 may be disposed along the sides 46, 48 of the blow mold such that movement of the sliders causes tearing of the sides of the parison 26. Similar sliders adjacent to the upper and lower ends of the mold parts may be used to tear the upper and lower ends of the parison, or the upper and lower ends of the parison may be severed (for example, by cutting with a blade) if desired. When the interior of the parison pieces are accessible, one or more objects 40 may be setup for inclusion at least partially within the formed tank. The object(s) may be coupled to the interior surface of at least one parison piece so that the object is at least partially, and may be fully, within the formed tank after final blow molding of the tank. The object(s) may be a fuel system component (e.g. pump, valve, baffle, tube or the like) or a carrier for at least one fuel system component, such as a fuel pump, attached thereto or attached thereto later after the tank is formed.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A blow molding process for making a hollow body, in particular a fuel tank, comprising the following steps:
   placing a parison between parts of a blow mold;
   at least partially closing the blow mold whereby the end regions of the parison are closed in a gas tight manner;
   subjecting the interior space of the parison with a pressure medium whereby the parison is at least partially pressed against the blow mold parts and the hollow body is preformed;
   engaging portions of the parison with clamping devices, the clamping devices being associated with the blow mold parts;
   moving one or both of the blow mold parts relative to each other or moving at least one clamping device relative to the blow mold parts whereby the parison is torn between the clamping devices; and
   placing at least one object between the torn apart pieces of the parison.

2. The process of claim 1 wherein the object is formed as a carrier for at least one fuel system component, such as a fuel pump, attached thereto.

3. The process of claim 1 wherein the clamping devices each comprise a groove into which groove material of the parison is received when the parison is subjected to the pressure medium.

4. The process of claim 3 wherein the clamping devices each comprise a clamping member which is adapted to be displaced relative to the blow mold parts, and a stop surface disposed opposite to the clamping member, wherein the groove is formed between the clamping member and the stop surface and wherein one or both of the clamping member and the stop surface is moved relative to the other to facilitate the clamping of the material of the parison.

5. The process of claim 1 wherein at least one clamping device is moved to tear the parison between two clamping devices without corresponding movement of the mold parts.

6. The process of claim 5 where two clamping devices are moved in opposed directions away from each other to tear a portion of the parison between the clamping devices.

7. The process of claim 1 wherein the torn apart pieces of the parison are placed against the parts of the blow mold and the space between the half-pieces and the parts of the blow mold is evacuated or an interior space of the parison is subjected to a pressure medium while the blow mold is closed, in order to perform a forming of the pieces of the parison which corresponds to the final shape of the hollow body.

8. The process of claim 1 wherein the object is brought into contact, in a form-fitting and/or friction-fitting manner, with the inside of the wall of at least one of the pieces at least at specific locations before the blow mold parts are closed.

9. The process of claim 8 wherein the object is made at least partially of a plastic material which can be welded to at least one piece of the parison.

10. The process of claim 1 wherein a further process step the pieces of the parison are, after being fully formed against the parts of the blow mold, materially fused to each other with opposing edge regions, which regions are still molten-hot or which have been reheated, by moving the blow mold parts against each other.

11. The process of claim 1, wherein the parison is introduced into the blow mold by a gripping device or an extruder.

12. The process of claim 1, wherein subjecting the parison to the pressure medium causes the parison to expand.

13. The process of claim 1, wherein the clamping devices comprise one or more sliders that are movable relative to the parts of the blow mold; wherein parison tearing occurs by movement of one or more of the sliders relative to the parts of the blow mold.

14. The process of claim 13, wherein the sliders are driven by one or more actuators.

15. The process of claim 1, wherein the tearing of the parison occurs in a region of the parison that does not form a part of the hollow body.

16. The process of claim 1, wherein the method further comprises at least one of providing a coating to an interior surface or providing a different contour to at least a portion of the interior surface of the torn apart pieces.

17. A blow molding process for making a fuel tank, comprising the following steps:
   placing a parison between parts of a blow mold;
   at least partially closing the blow mold whereby the end regions of the parison are closed in a gas tight manner;
   subjecting the interior space of the parison with a pressure medium whereby the parison is at least partially pressed against the blow mold parts and the hollow body is preformed;
   engaging portions of the parison with clamping devices, the clamping devices being associated with the blow mold parts;
   moving one or both of the blow mold parts relative to each other or moving at least one clamping device relative to the blow mold parts whereby the parison is torn between the clamping devices;
   placing at least one fuel system component or a carrier for at least one fuel system component between the torn apart pieces of the parison;
   placing the torn apart pieces of the parison against the parts of the blow mold and evacuating the space between the half-pieces and the parts of the blow mold or subjecting an interior space of the parison to a pressure medium while the blow mold is closed, in order to perform a forming of the pieces of the parison which corresponds to the final shape of the hollow body; and
   fusing opposing edge regions of the formed pieces of the parison to each other, which regions are still molten-hot or which have been reheated, by moving the blow mold parts against each other.

18. The process of claim 17, wherein the clamping devices each comprise:
   a groove into which groove material of the parison is received when the parison is subjected to the pressure medium;
   a clamping member which is adapted to be displaced relative to the blow mold parts, and
   a stop surface disposed opposite to the clamping member;
   wherein the groove is formed between the clamping member and the stop surface and wherein one or both of the clamping member and the stop surface is moved relative to the other to facilitate the clamping of the material of the parison.

19. The process of claim 17, wherein at least one clamping device is moved to tear the parison between two clamping devices without corresponding movement of the mold parts.

* * * * *